3,129,235
PROCESS FOR PRODUCTION OF LOW-MELTING
EDIBLE HARDENED OIL
Tsutomu Kuwata, Tokyo, Shizuo Takumi, Kamakura-shi, Kanagawa-ken, and Toshio Hashimoto, Yokohama-shi, Kanagawa-ken, Japan, assignors to Nikki Kagaku Kabushiki Kaisha, Tokyo, Japan, a corporation of Japan
No Drawing. Filed July 31, 1962, Ser. No. 213,615
Claims priority, application Japan Mar. 17, 1962
5 Claims. (Cl. 260—409)

This invention relates to a process for production of low-melting edible hardened oil.

A selective hydrogenation process of fatty oils which comprises hydrogenating esters or fatty oils containing higher unsaturated acids than linolic acid under a hydrogen pressure of normal or less than 10 atmospheres using the copper-chromium-manganese-oxide catalyst (the hydrogenation catalyst according to Japanese Patent No. 20,007), which is prepared by heating the precipitate formed by adding aqueous ammonia to a solution of chromium salt, manganese salt and copper salt at about 350° C., after water-washing and drying, to hydrogenate said higher unsaturated acid until oleic acid was described in Japanese Patent No. 244,354 invented by ourselves. According to our close examination of selective hydrogenating power of said catalyst, when hydrogenating cotton seed oil comprising the ingredients of linolic acid, oleic acid and stearic acid as test material, however, it was found that formation of a small quantity of saturated fatty acid was unavoidable in the resulted hydrogenated fatty oil, and the selective power of the catalyst being yet insufficient as shown in the following example. After making a thorough investigation, therefore, on the relation between the combining state of metallic oxides of catalyst and the selectivity in order to promote the catalyst selectivity, we have found the copper-chromium-manganase-oxide prepared in said procedure to be composed of CuO and $CuCr_2O_4$ combined with manganese. We have further found that when we use a novel catalyst composed mainly of $CuCr_2O_4$ combined with manganese, prepared by eliminating CuO as much as possible by treating the CuO containing catalyst with acid or alkali, or converting water-insoluble CuO into water-soluble cuprous chromate ($CuCr_2O_7 \cdot 2H_2O$) by the reaction of $CrO_3$ and CuO, the formation of saturated acid in the resulting product becomes scarcely noticeable and the content of linolic acid remarkably diminished, and thus a low-melting hardened oil of higher stability as compared with the case of employing the conventional catalyst may be obtained.

In addition, it is quite desirable to minimize or reduce the quantity of the trans-form of the unsaturated fatty oil formed in the hydrogenation process. In the case, wherein the most part of unsaturated fatty acid is oleic acid such as razor back oil the use of cuprous catalyst, contrary to that of nickel catalyst, gives no stereoisomerization of trans-form of oleic acid, thereby enable to reduce the formation of trans-form of oleic acid to a small quantity, whereas in the case of cotton seed oil, containing linolic acid in a large amount, the formation of a remarkable amount of trans-form of oleic acid in hydrogenation process of linolic acid to oleic acid is unavoidable. Hereupon the inventors, after an earnest research to reduce the formation of trans-form of oleic acid, have found acidic substances to be still retained in the conventional copper-chromium-manganese-oxide even when washed thoroughly with hot water and the presence of said substances to be one of the cause to give stereoisomer. Thus, we have succeeded in diminishing remarkably the quantity of the resulting trans-form of oleic acid by employing the novel catalyst, which is prepared by eliminating CuO as much as possible, then neutralized with an alkaline solution of hydoxide of barium, magnesium or calcium, or by treating said catalyst with a solution of lead salt or cadmium salt to fix acidic substances as water-insoluble substances, or further employing said novel catalyst together with a small quantity of metallic soap of lead or cadmium. It has been also found that the activity and selectivity of the catalyst subjected to neutralizing procedure has not been inferior as compared with one not subjected to said procedure.

Therefore, the object of the present invention is to obtain a low-melting edible hardened oil of high stability. This object is accomplished by using a novel catalyst of copper-chromium-manganese-oxide composed mainly of $CuCr_2O_4$, prepared by eliminating as much as possible CuO contained in the conventional copper-chromium-manganese-oxide described in the aforementioned Japanese Patent No. 244,354, by treating said oxide with acid or alkali, or by treating said oxide catalyst with $CrO_3$, thereby to convert the water-insoluble CuO into water-soluble compound and then washing with water. Another object of the present invention lies in reducing the formation of trans-form of oleic acid by employing as catalyst, if necessary, the further treated catalyst obtained by treating said novel catalyst with an aqueous solution of hydroxide of barium, calcium or magnesium, or with an aqueous solution of lead salt or cadmium salt to neutralize acidic substances contained in said novel catalyst, or by employing said novel catalyst together with a small quantity of metallic soap of lead or cadmium.

The present inventors also have found the most part of cholesterol, which is contained in a remarkable quantity in marine-animal oil, such as razor back oil and fish oil, to be converted into cholestenone by means of employing cuprous catalyst such as above described novel catalyst, contrary to nickel catalyst. Cholesterol implicates, as is well-known, a biochemical problem, being considered as a cause of high blood pressure when absorbed into human body in a large quantity. On the other hand, cholestenone is known as harmless because it is not to be absorbed into human body. It is noted here, therefore, that the edible hardened oil according to the present invention has an advantage of diminishing remarkably the apprehension for high blood pressure concerned hitherto, even when taken in a large quantity. Examples are shown in the following.

*Example 1*

Into a solution of 0.55 mol of sodium bichromate in distilled water 28% ammonia water containing 2 mols of ammonia was added to make up to 1 liter, then 1 liter of distilled water containing 1 mol of copper sulfate and 0.1 mol of manganese sulfate was added dropwise under agitation. The precipitate thus formed was pulverized after water-washing and drying and then roasted at about 350° C., the product being referred to as "A." Next, "A" was treated with 1:2 dilute ammonia water, 10 times in volume, water-washed and dried, the product being referred to as "B." "A" was treated in the same manner with 10% acetic acid, the product being referred to as "C." And further "A" was treated in the same manner with 1:1 dilute hydrochloric acid, the product being referred to as "D." Besides, "A" was treated with an enough quantity of aqueous chromic acid solution to convert CuO contained in "A" to $CuCr_2O_7$ and washed thoroughly with hot water after the reaction of CuO with $CrO_3$, the product being referred to as "E." The molar ratio of CuO to $CuCr_2O_4$ in "A," "B," "C," "D" and "E" are shown in the following table:

|  | $CuO/CuCr_2O_4$ |
|---|---|
| A (conventional) | 0.97 |
| B (treated with ammonia water) | 0.86 |
| C (treated with acetic acid) | 0.71 |
| D (treated with hydrochloric acid) | 0.29 |
| E (treated with chromic acid, thereafter washed with hot water) | * |

*CuO contained was in such a degree as not to be detected by X-ray diffraction analysis.

*Example 2*

Hydrogenation of cotton seed oil was carried out using the catalysts "A," "B," "C" and "D," described in Example 1, under the following conditions. The results are shown in the following table.

Hydrogenation conditions:
- Sample _____ 100 g.
- Catalyst _____ 2 g.
- Hydrogen pressure _____ Atmospheric.
- Temperature _____ 200° C.
- Time _____ 180 min.
- Hydrogen stream rate _____ 1 lit./min.
- Rotation of agitating wing _____ 850 r./min.

Composition of the hydrogenated cotton seed oil

| Catalyst | Melting point °C. | Iodine value | Saturated acid, Percent | Oleic acid, Percent | Linolic acid, Percent | Selectivity, Percent |
|---|---|---|---|---|---|---|
| None | | 115.06 | 23.33 | 24.19 | 52.48 | |
| A | | 74.67 | 26.03 | 61.30 | 12.67 | 90 |
| B | 34.6 | 68.32 | 24.96 | 70.69 | 4.35 | 99 |
| C | 34.1 | 69.47 | 24.12 | 72.03 | 3.85 | 100 |
| D | 33.5 | 68.96 | 23.54 | 72.81 | 3.65 | 100 |

¹ Slectivity in the above table is calculated as follows:
$$\frac{\text{Produced Oleic Acid}}{\text{Hydrigenated Linolic Acid}} \times 100$$

As is seen in the above table, the selectivity for "A" was 90, whereas for "B," "C" and "D," it was 99 or 100. And the content of linolic acid was remarkably diminished for each of "B," "C" and "D," as compared with that for "A." In another test, wherein 5 g. of "A" was used and other hydrogenation conditions were the same as aforementioned, the content of linolic acid in the hydrogenated oil were reduced to 4.6%, while its melting point was 36.4° C., being considerably higher than those for "B," "C" and "D."

*Example 3*

In this test, sample was razor back oil from a marine-animal of the Antarctic Ocean, and catalyst used was "D" treated with an aqueous barium hydroxide solution. The razor back oil has an iodine value of 106.4 and fishy odour and its content of higher unsaturated acid being as follows:

| | Percent |
|---|---|
| Diene | 3.6 |
| Pentaene | 4.3 |
| Triene | 3.1 |
| Hexaene | 2.1 |
| Tetraene | 3.9 |

When 100 g. of sample and 2 g. of catalyst are used and reaction time were 40 min., the hydrogenation conditions otherwise being the same as those of Example 2, the hydrogenated oil obtained has the melting point of 18.5° C., iodine value of 75.4, diene content of 0.2%, and free from highly unsaturated acid higher than triene, and thus an edible hardened oil of high stability and low melting point without any fishy odour was produced. In another test, wherein "E" treated in the same manner as "D" was used as catalyst, a good result, almost the same as in the case of using retreated "D," was obtained.

*Example 4*

The results of hydrogenation of cotton seed oil under the same hydrogenation conditions as those in Example 1, except that the catalyst employed was 2 g. of C with 0.1 g. of metallic soap described hereunder, was shown in the following table:

| Metalic soap | Iodine value | Selectivity, Percent | Quantity of trans-form produced, Percent |
|---|---|---|---|
| None | 68.96 | 100 | 30.3 |
| Lead soap | 66.19 | 98 | 22.4 |
| Cadium soap | 66.67 | 98 | 21.0 |

It is clearly seen from the above table that the formation of trans-form of oleic acid was remarkably reduced without hurting the activity and selectivity of the catalyst, when metallic soap such as of lead or cadmium soap was added to catalyst "C."

What we claim:

1. A process for producing low-melting edible hardened fatty oil of superior stability by hydrogenation of a fatty oil which comprises hydrogenating said oil at a temperature of between about 130° C. and 200° C., under a hydrogenation pressure of from 1 to 10 atmospheres and for from ½ to 2 hours in the presence of about 2% by weight, based on the weight of said oil, of a copper-chromium-manganese oxide catalyst substantially devoid of free CuO, said catalyst being prepared by adding ammonia to a solution containing in solution, chromium salt, manganese salt and copper salt, the addition of ammonia being sufficient to precipitate the copper, manganese and chromium from said solution; separating the precipitate from the remaining liquid; washing the separated precipitate; drying the washed precipitate; drying and then calcining the precipitate at about 350° C.; and thereafter removing free CuO present in said calcined precipitate by treating said precipitate with a solution selected from the group consisting of acid, alkali and chromic acid; and recovering the resulting low-melting edible hardened fatty oil product.

2. A process according to claim 1 in which said copper-chromium-manganese oxide catalyst is further treated with an aqueous solution of a compound selected from the group consisting of barium hydroxide, calcium hydroxide and magnesium hydroxide to neutralize acidic substances therein.

3. A process according to claim 2 in which said copper-chromium-manganese oxide catalyst is further treated with an aqueous solution of a compound selected from the group consisting of lead salts and cadmium salts to fix acidic substances therein as insoluble substances.

4. A process according to claim 1 in which the catalyst is used together with a small quantity of metallic soap selected from a group consisting of lead soup and cadmium soap.

5. A process according to claim 1 wherein the fatty oil is razor back oil.

References Cited in the file of this patent

UNITED STATES PATENTS

| 1,844,857 | Larson | Feb. 9, 1932 |
| 2,302,994 | Gwynn | Nov. 24, 1942 |
| 2,410,102 | Paterson | Oct. 29, 1946 |

FOREIGN PATENTS

| 670,906 | Great Britain | Apr. 30, 1952 |